United States Patent [19]
d'Alayer de Costemore d'Arc

[11] Patent Number: 5,788,174
[45] Date of Patent: Aug. 4, 1998

[54] CENTERING MECHANISM FOR MULTI-CASSETTE LOADING/UNLOADING SYSTEM

[75] Inventor: Stephane M.A. d'Alayer de Costemore d'Arc, Genappe, Belgium

[73] Assignee: Staar S.A., Brussels, Belgium

[21] Appl. No.: 731,011

[22] Filed: Oct. 9, 1996

[30] Foreign Application Priority Data

Jan. 4, 1996 [BE] Belgium ............... 96 00005
Mar. 23, 1996 [BE] Belgium ............... 96 00252

[51] Int. Cl.⁶ ............................................. G11B 15/60
[52] U.S. Cl. ............................................. 242/338
[58] Field of Search ........................... 242/336, 338, 242/338.4, 339; 360/94, 96.5

[56] References Cited

U.S. PATENT DOCUMENTS

| | | | |
|---|---|---|---|
| 4,864,439 | 9/1989 | Duurland | 360/96.5 |
| 4,918,550 | 4/1990 | Baranski | 360/94 |
| 5,046,169 | 9/1991 | Tsujino | 360/96.5 |
| 5,101,304 | 3/1992 | Sakumoto et al. | 360/96.5 |
| 5,184,261 | 2/1993 | Noguchi | 360/96.5 |
| 5,231,553 | 7/1993 | Weber et al. | 360/94 |
| 5,357,385 | 10/1994 | Shimizu et al. | 360/96.5 |
| 5,465,246 | 11/1995 | d'Arc | 369/77.2 |
| 5,617,271 | 4/1997 | Nishimura et al. | 360/96.5 |

FOREIGN PATENT DOCUMENTS

| | | | |
|---|---|---|---|
| 50-34516 | 4/1975 | Japan . | |
| 1-140460 | 6/1989 | Japan | 360/96.5 |

*Primary Examiner*—John P. Darling
*Attorney, Agent, or Firm*—Leydig, Voit & Mayer, Ltd.

[57] ABSTRACT

A centering mechanism for centering cassettes in a defined location in a housing of a cassette loading/unloading system for recording/playback apparatus, each of the cassettes having a shell with a bottom face and an information carrier within the shell, and each of the cassettes having a similar cavity with a standard profile on the bottom face of the cassette which provides access to the information carrier. The centering mechanism includes a centering tab and a movable tab support, the centering tab being supported by the tab support in a cassette centering position projecting vertically above a bottom wall of the housing where it is located to be received in a cavity of a cassette placed in the defined location in the housing and in a non-interfering position free and clear of the housing and cassette, the centering tab defining a profile which approximately matches the standard profile of the cassette cavity, and a member which is connected to move the tab support and displace the centering tab between its cassette centering position and its non-interfering position during loading/unloading operations so that the centering mechanism does not interfere with recording/playback of information on the information support.

25 Claims, 5 Drawing Sheets

CENTERING MECHANISM FOR MULTI-CASSETTE LOADING/UNLOADING SYSTEM

RELATED APPLICATION

This application is related to application Ser. No. 08/731,009, filed Oct. 9, 1996, entitled Multi-Cassette Loading/Unloading System.

FIELD OF THE INVENTION

The present invention relates to apparatus for recording and/or playback of information on information carriers such as video recording tape and, more particularly, to centering mechanisms for insuring that cassettes placed in systems for loading/unloading cassettes in the apparatus are properly presented so that they may be safely loaded by the loading/unloading system avoiding any breakdown, damage or malfunctioning of the recording/playback apparatus.

BACKGROUND OF THE INVENTION

In loading/unloading systems of the type designed for analog compact cassettes, the configuration of a housing assists in preventing any mis-presentation of a cassette because the shape of the housing matches the shell of this type cassette which is asymmetric; one of its edges is thicker than other edges. Using such a distinctive housing configuration to insure a cassette is properly presented is not an option when designing loading/unloading systems for cassettes having an almost perfect parallelepiped shell, because all the edges and faces of such a shell are almost identical and the corresponding housing configuration necessarily must be almost perfectly symmetrical. This applies to the cassettes of the DVC (Digital Video Cassette) format recently launched on the professional and consumer markets.

It is desirable and even necessary, for avoiding any breakdown, damage or malfunctioning of the recording/playback apparatus, that the user be promptly warned should the user mis-present a cassette when placing it in the housing and, preferably, at the very moment upon doing so.

Heretofore, as for example disclosed in Japanese application 50-34516, a mis-presented cassette is detected, however, detection takes place only during the loading operation of the mis-presented cassette which, in most cases, unfortunately is too late to avoid damage to the apparatus.

SUMMARY OF THE INVENTION

The principle object of the present invention is to overcome the above drawbacks in loading/unloading systems, particularly multi-cassette loading/unloading systems of the drawer type which have a housing adapted to receive cassettes of different size, by providing a reliable, low-cost and efficient mechanism which insures the proper presentation of any cassette of the different sizes accommodated upon its placement by the user in the housing, and which immediately warns the user in the instances of mis-presentation or mis-positioning.

A more specific object of the invention is to provide a mechanism which centers a cassette in a defined location in the housing of a multi-cassette loading/unloading system so that it is properly presented and positioned for the loading operation.

Another object is to provide a centering mechanism which can be easily adapted to any cassette loading/unloading system of the type utilizing a horizontally translatable housing for loading/unloading the cassette.

BRIEF DESCRIPTION OF THE DRAWINGS

Further objects and features will become evident as the following description proceeds taken in conjunction with the accompanying drawings, in which.

DETAILED DESCRIPTION

Figure 10:
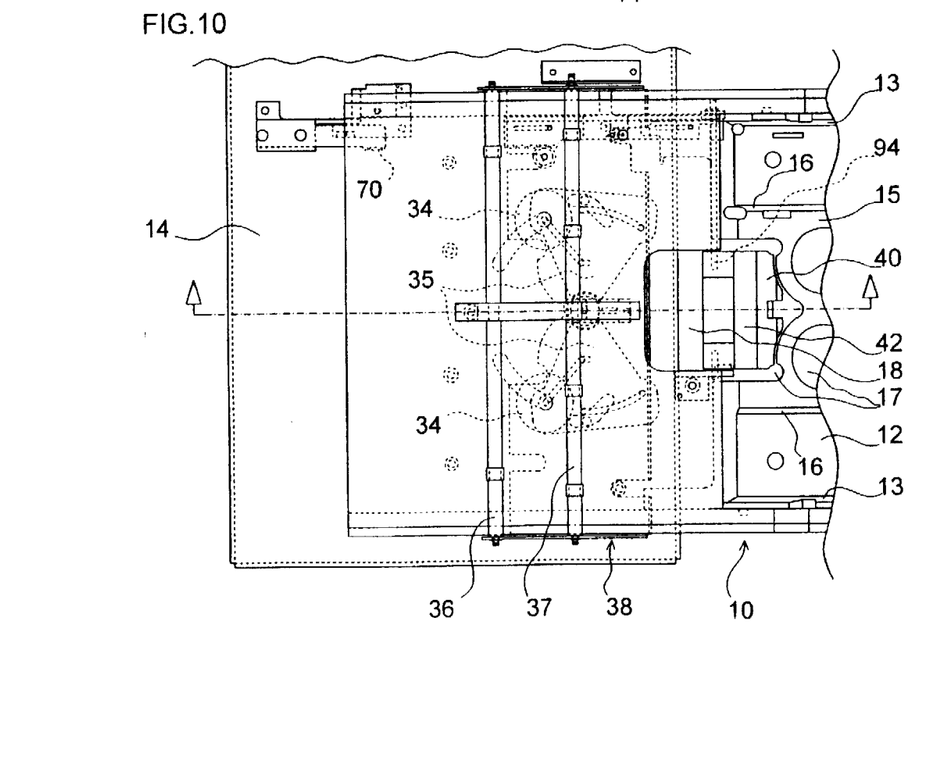
FIGS. 10, 11 and 11A are top and lateral sectional views similar to FIGS. 1, 1A and 3A adding schematically further components of the loading/unloading system omitted from the previously listed figures.
Figures 11, 11A:
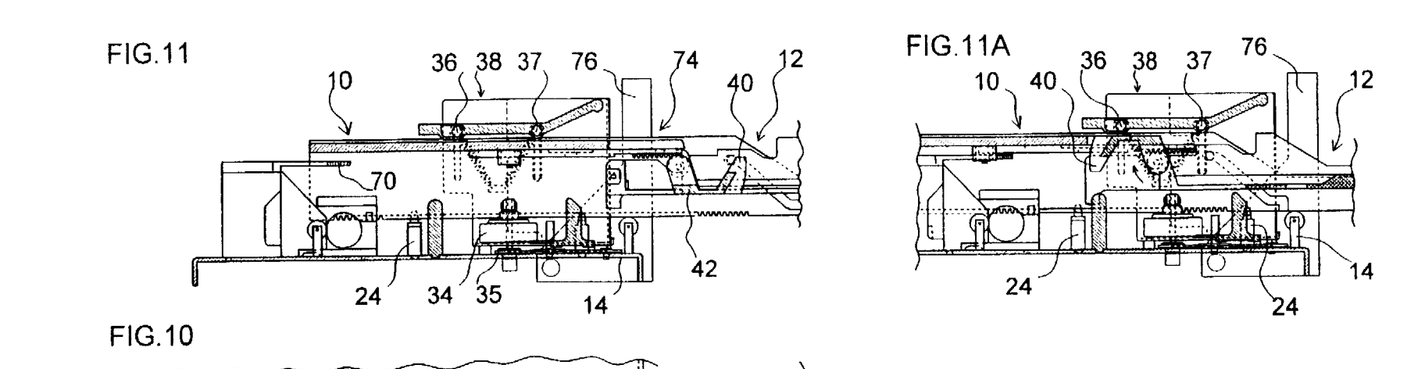

In its best mode the centering mechanism of the invention is incorporated as shown schematically in FIGS. 10, 11 and 11A in a multi-cassette loading/ unloading system of the type disclosed in the above-mentioned related application entitled Multi-Cassette Loading/Unloading System, to which reference may be made for a full description of the system, only the elements essential for the understanding of the present invention being shown in the accompanying drawings or described herein. It is also noted that the centering mechanism of the invention can be easily adapted to any loading/unloading system of the type utilizing a translatable housing to transfer a cassette between loading/unloading and operative positions and the invention is not restricted to the particular system shown in the drawings and described in the above-mentioned related application.

The multi-cassette loading/unloading system illustrated in the drawings in which the two presently disclosed embodiments of the present invention are incorporated, is constructed to receive cassettes of the DVC (Digital Video Cassette) format. The Standard DVC cassette has a recording capacity of four hours. The Mini DVC cassette has the shortest recording capacity while the Professional DVC has a recording capacity almost halfway between the Mini and Standard DVC. The housings of all three DVC cassettes are substantially of the same thickness, are parallelepiped, but in plan view the housings or shells of the DVC cassettes are of different size and the tape reels have different spacings. The Standard DVC cassettes are the largest and have the greatest cassette-reel spacing; the Mini DVC cassettes are the smallest and have the smallest cassette-reel spacing; the Professional DVC cassettes are intermediate in size and have intermediate cassette-reel spacing.

Turning now to FIGS. 1,1A and 10–11A, the loading/unloading mechanism comprises a drawer 10 incorporating a vertically movable housing 12, which has an overall size in plan view a little bit larger than that of the largest cassette of the format to be accommodated (herein, the Standard DVC), said housing including peripheral walls 13 spaced to provide a boundary defining a location for such a cassette and standing slightly tilted outwards to ensure easy and accurate centering of an inserted cassette. This housing 12 also includes in its front portion, close to the main frame 14 of the unit, a shallow flat recess 15 in the bottom wall of the housing 12 defining a location for the smallest cassette to be accommodated (herein, the Mini DVC) and having peripheral walls 16 spaced to define a location for this cassette. It will be seen that the apparatus may be constructed to receive any two different size DVC cassettes of the three presently specified, including the Professional DVC cassette instead of the Standard one, by spacing the peripheral walls 16 to provide a boundary fitting the selected larger size cassettes. To provide an apparatus capable of receiving all three DVC cassettes, a second shallow recess would be provided having a boundary defining a location intermediate in size between the recess 15 and the location defined by the peripheral walls 3.

Hereinafter, a first or large cassette is intended to mean a cassette of the largest size of a given format to be accommodated and a second or small cassette is intended to mean a cassette of a smaller size of the same given format.

Further, openings 17 are provided in the bottom wall of the housing 12 which allow passage of all elements having to cooperate with cassettes of any size and the information carrier enclosed in it when the cassette is in the operative position, such as the driving means for the information carrier and cassette reels, playback/recording means and elements setting the information carrier at the operative level with respect to its driving and playback/recording means. Apertures 18 close to the housing 12 are provided in the drawer 10 to enable a user to easily pick-up by one's fingers and remove any cassette therefrom. The drawer 10 is supported in its horizontal plane by rollers fixed on the main frame 14 and is driven inward from the loading/ejected position and returned outward by an electric micro-motor and a gear-train, elements both well-known in the art and thus not shown.

The loading/unloading mechanism is constructed such that a cassette of any size accommodated, properly placed and positioned in a defined location in the housing 12 of the drawer 10, is translated inward from the loading/ejected position and lowered vertically downward onto the reference members 24 (FIGS. 7A,11A) to an operative position and into cooperative association with recording/playback heads and information carrier (tape) driving means (not shown). The housing 12 bears at its extremities (FIG. 1A) horizontal studs 28 which engage and cooperate with inclined grooves 30 inside the lateral walls 32 of the drawer 10 to allow vertical movement of the housing 12 relative to the drawer 10 so as to lower an inserted cassette onto reference members 24 as a result of the loading movement or raise a cassette from said members 24 before ejecting it from the unit. The driving means for the cassette reels, preferably drive spindles 34 (FIG. 4), which project through the openings 17 in the housing 12 when the cassette is in operative position, are variably-spaced and carried on support plates 35 (FIG.11) which are mounted to rotate about a common shaft attached to the main frame 14. The spacing of the drive spindles 34 is adjustable to match the cassette-reel spacing of the different size cassettes accommodated in the apparatus by rotating the plates 35 toward and away from each other. The drive spindles 34 have a first position corresponding to a cassette-reel spacing for a large cassette such as a Standard DVC cassette, and a second position corresponding to a second smaller cassette-reel spacing such as for a Mini DVC cassette. In this loading/unloading system there is also included pressure rollers 36,37 (FIGS. 10,11,11A) carried by a mobile member 38 which engage the upper surface of the shell of a cassette in the housing 12 as the drawer 10 is moved inwards into the apparatus and press the cassette downward as it is being loaded or unloaded. The mobile member 38 is linked to the support plates 35 for the drive spindles 34 to adjust the spacing of the drive spindles to match the particular size cassette in the housing 12 responsive to loading movement of the housing 12 and drawer 10.

Figure 6:
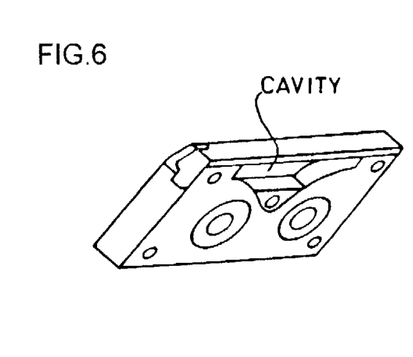
FIG. 6 is a perspective view, from below, of a cassette of the DVC format, more particularly, a Mini DVC cassette.

Turning now to FIG. 6, this represents any DVC cassette which includes a cavity (labeled CAVITY) in the bottom or lower face of the shell at the front portion; when the cassette is located in operative position, the shutter is pivoted to allow access to the information support, and components penetrate the cavity including, among others, guides ensuring loading of the information support around the drum supporting the playback/recording heads, a sector of the drum, shafts, capstan, pressure rollers and any other elements which cooperate with the information support, in the DVC cassette, a magnetic tape. For all cassettes of the same format or standard, e.g. the DVC format, a similar standard cavity is provided which has the same size, shape and profile and is positioned at the same location whatever the size of the cassette (Standard, Professional, Mini).

In accordance with the invention, the centering mechanism includes a centering tab 40 which is supported by a movable tab support 42 carried by the drawer, the centering tab 40 being supported within the openings 17 in the drawer when the drawer is in its loading/ejected position (FIG. 1A) outside the unit in a cassette centering position. In the cassette centering position, the centering tab 40 projects or extends substantially vertically above the bottom of the housing 12 carried by the drawer 10. The centering tab 40 is thus positioned to be received in a cavity in the bottom face of a properly presented cassette placed in the housing 12 when the housing and drawer 10 are in the loading position, the tab centering 40 having a shape defining a profile which approximately matches the standard profile of the cavity of any DVC cassette. Accurate centering and positioning is thereby insured of any DVC cassette properly presented and placed by a user in the housing 12 of the drawer 10 with the centering tab 40, as shown in FIG. 1B projecting into the cavity.

Figure 3:
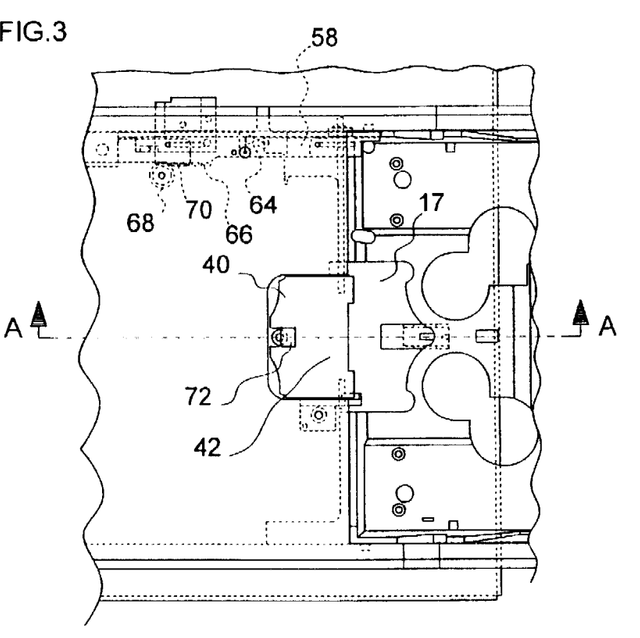
FIG. 3 is a view similar to FIG. 1 with the housing further inward in the loading operation and the centering tab rotated clear of the cassette cavity.
Figure 3A:
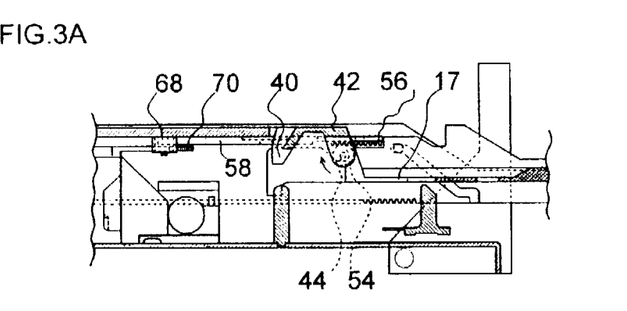
FIG. 3A is a lateral sectional view similar to FIG. 1A, with the housing and centering tab element in the position shown in FIG. 3.

To remove the centering tab 40 during the loading operation from its centering position (FIGS. 1A,11,12) within the openings 17 in the housing 12 and a cassette, and to rotate it in an arc to a non-interfering position (FIGS. 3A,11A) where the centering tab 40 is free from interference with the loading operation or the operation of the driving and playback/recording components of the apparatus, the movable tab support 42 is linked to the drawer 10, and the housing 12 carried by the drawer 10, and moved responsive to their translation. To this end, the tab support 42 is fixed on and supported for rotation by first and second horizontal shafts 44,46, the first shaft 44 being supported for rotation by a bearing 48 in the vicinity of one side of the movable support 42 mounted to a horizontal plate member 50 of the drawer 10 and powered to rotate during the inward movement of the drawer 10 and housing 12. The other side of the movable support 42 is fixed to the second horizontal shaft 46 which is free to rotate being supported by a bearing 52 also mounted to the underside of the plate member 50. To provide power to rotate the first shaft 44 and thereby rotate the movable support 42 to rotate the centering tab 40 in an arc between the centering position (shown in FIGS. 1A,12) and the non-interfering position (shown in FIG. 3A), the first shaft 44 has a vertical gear 54 fixed to it near its end close to the lateral wall 32 of the drawer 10, the gear 54 meshing with gear teeth 56 provided on an upwardly facing edge of a slider 58 mounted for translation movement on the plate member 50 by studs 60 on the plate 50 cooperating with grooves 62 provided in the slider 58.

Figures 1, 1A, 4A:
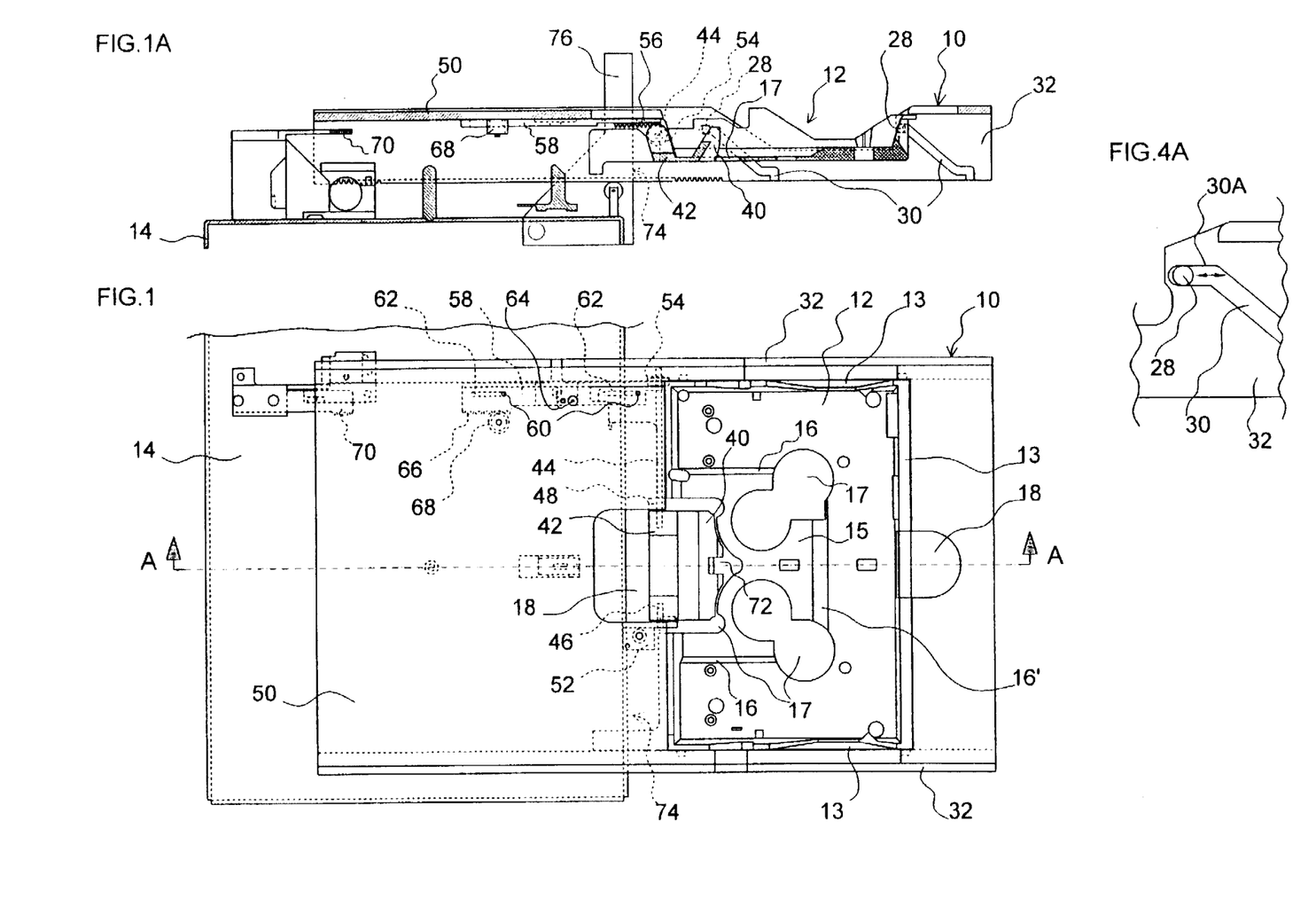
FIG. 1 is a fragmentary top view of a multi-cassette loading/unloading system incorporating a first and best mode embodiment of the centering mechanism of this invention, represented in a loading/ejected position of the housing, but with no cassette shown.
FIG. 1A is a lateral sectional view, in the section plane A—A, of the housing mechanism shown in FIG. 1.
FIG. 4A is an enlarged fragmentary side view illustrating a guide groove of the centering mechanism.
Figure 1B:
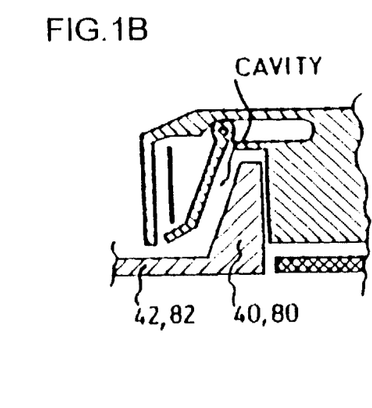
FIG. 1B is an enlarged fragmentary sectional view of a front portion of a cassette of the DVC format showing a cavity which is a characteristic of such type cassette and a tab element of the centering mechanism of the invention received in the cassette cavity.
Figure 2:
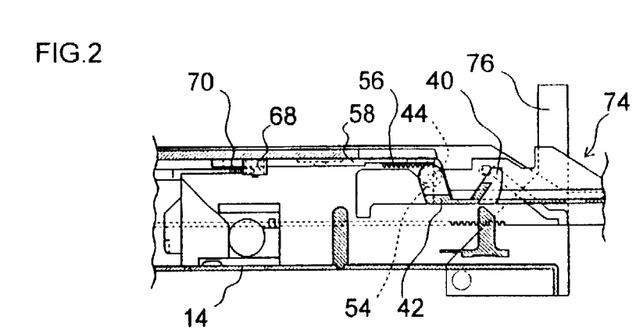
FIG. 2 is a lateral sectional view similar to FIG. 1A, with the housing in a partially inward position.

In the loading/ejected position of the drawer 10 and housing 12, the slider 58 is set in its far-left position as shown in FIG. 1. The hair-spring 64, which is attached to the plate member 50 of the drawer 10 and the slider 58, keeps the slider 58 stable in this far-left position and the slider 58 keeps the centering tab 40 in its centering position. When the drawer 10 and housing 12 move inward during the loading operation and reach a position (shown in FIGS. 2,3A) partially inside the apparatus, a horizontal gear 68 which is mounted for free rotation on a vertical shaft fixed to the plate member 50 and which is in mesh with gear teeth 66 on a side edge of the slider 58 is moved so that it also meshes with horizontal gear teeth 70 fixed to the apparatus frame 14. In this position the centering tab 40 is still in its centering position and the housing 12 and cassette are located nearly above the driving means for the cassette reels and the other playback/recording components of the apparatus.

Upon continuation of the inward or forward movement of the drawer 10 and housing 12, the drawer powers a clockwise rotation of the horizontal gear 68 which is carried by the drawer 10 by reason of relative movement between the gear 68 and the fixed gear teeth 70 on the apparatus frame 14, which causes the slider 58 to be driven to the right (in FIGS. 2,3A) or rearward, in a direction just opposite that of the drawer movement. Because the downwardly facing gear teeth 56 on the slider 58 mesh with the vertical gear 54 on the first shaft 44 connected to the movable support 42 for the centering tab 40, the first shaft 44 and thus the tab support 42 are rotated by the slider 58 in a clockwise direction (FIG. 2) and the centering tab 40 is rotated in an arc through an angle of 180 degrees. As a result, the centering tab 40 is rotated clear of the openings 17 in the housing 12 to the non-interfering position shown in FIGS. 3,3A,4 and 11A. As shown in FIGS. 1,3, 4 and 12 the centering tab 40 includes a slot 72 allowing passage of the unlocking means for the cassette reels as the cassettes are transferred to the operative position and the optical means specific to the DVC format and standards. Further, the hair-spring 64 has rocked over its balanced point (FIG. 3) and now keeps the slider 58 stabile in its far-right position.

Figure 4:
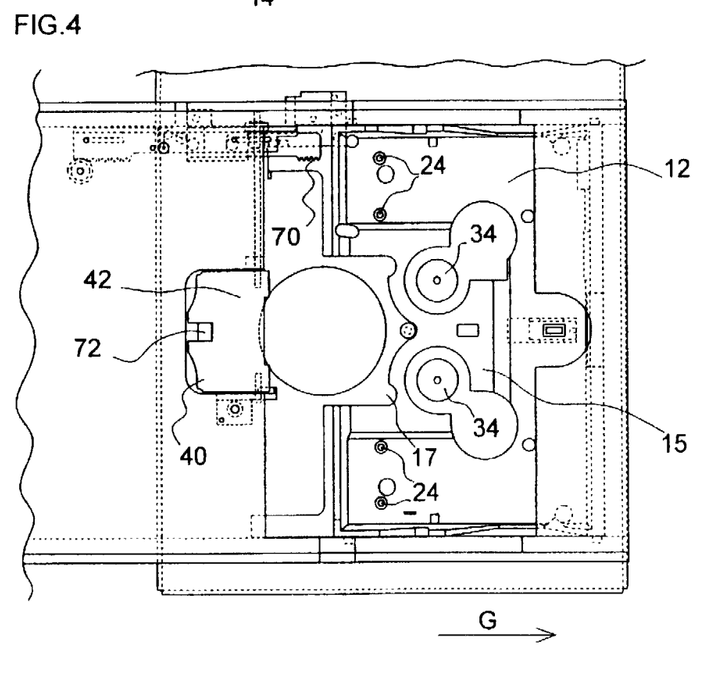
FIG. 4 is a view similar to FIG. 1 with the housing entirely inside the apparatus, in operative position.

Upon farther translation of the drawer 10, the housing 12 engages an abutment on the frame 14 which causes lowering of the housing 12 by interaction between the studs 28 and the inclined grooves 30 inside the lateral walls 32,33 of the drawer 10, which lowers the cassette onto the reference supports 24 to the position shown in FIG. 4 where the cassette (not shown) is in the operative position; the playback/recording means and driving means have entered the openings 17 in the housing 12 and the cavity in the cassette while the centering tab 40 and its support 42 are fully clear of the driving and playback/recording means.

Figure 12:
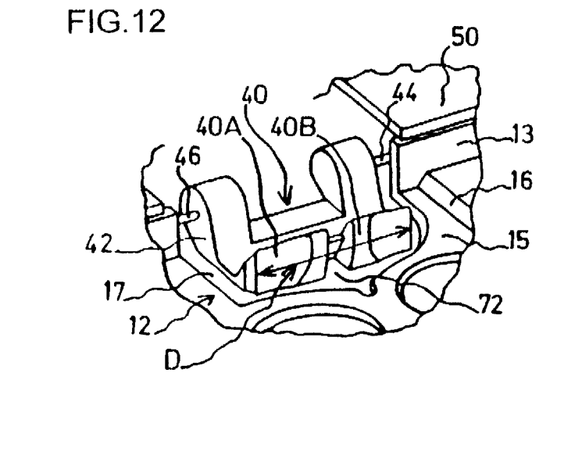
FIG. 12 is a perspective view showing the centering tab and tab support in centering position.

FIGS. 4 and 12 clearly illustrate the very reduced space required for the operation of a rotary centering tab 40 as well as the compactness of the mechanism required for its operation, thus internal space of the apparatus is saved for mechanical and/or electrical components.

Figure 5:
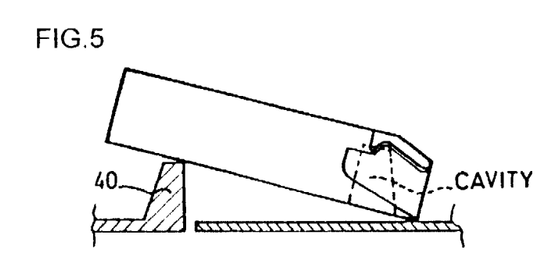
FIG. 5 is a schematic view of a mis-presented cassette shown tilted to a warning position when positioned on and engaged by the tab of the centering mechanism.

Further, having a rotary movement, the centering tab 40 can be molded as shown in FIG. 12 so as to precisely match the width of the cavity in the cassette and fit inside the cavity walls without interfering as it is rotated thus providing a better, more efficient and accurate centering and positioning of any cassette. As illustrated in FIG. 12, in its preferred form, the tab 40 has two legs 40A,40B separated by the slot 72 which is provided to allow passage of the optical and unlocking means as the tab 40 is rotated between its active/ centering and non-interfering positions. The two legs 40A, 40B have lateral extremities spaced by an outside lateral dimension D which approximately matches the width of the cavity so that the tab 40 fits inside the side walls of the cavity with clearance. The outside lateral dimension of the two legs of the tab 40 is important since a cassette resting on the bottom of the housing 12 with the tab 40 in its cavity will be positioned exactly centered laterally in its defined location. The height of the two legs 40A,40B of the tab 40 is important as well as the outside lateral dimension since the tab 40 should project as deep as possible into the cavity, as shown in FIG. 1B, and, therefore the height of the tab 40 approximately matches the depth of the cavity so that the tab 40 fits inside the cavity and has clearance with the bottom wall of the cavity and the shutter. Maximum height is important because if a cassette is mis-presented and rests in an inclined position on the tab 40 as shown in FIG. 5 it will be significantly raised so that the abnormality will be noticeable to the user. Thus, the profile of the centering tab 40 approximately matches the profile of the cavity.

In addition, it also has been observed that any cassette, even just approximately placed by the user in the housing 12, can be exactly centered by slightly shifting the cassette longitudinally so that it settles into its defined location within the boundary walls of either the housing 12 or recess 15. To this end, it is preferred to cause slight translational movement of the cassette relative to the housing 12 by the centering tab 40 during the loading operation utilizing, in this embodiment, the shape of the profile of the grooves 30 provided in the lateral walls 32 of the drawer 10 for the guidance of the studs 28 of the housing 12 as depicted in FIG. 4A. More particularly, by forming the grooves 30 with a substantially horizontal short leg 30A, which provides a stabile position for the housing 12 at the end-of-movement position, an initial short translational movement of the housing 12 is produced at the start of the loading operation due to displacement of the studs 28 in the leg 30A (to the right as viewed in FIG. 4A) until the studs 28 engage the inclined sections of the grooves 30. Because the centering tab 40 is effectively kept in its end-of-movement position by the hair-spring 64 via the slider 58 while the housing 12 undergoes this initial short translational movement, the result is the desired short translational movement of the cassette with respect to the housing 12. With this improved centering of a cassette not exactly positioned on the tab 40 by the user when placing the cassette in a defined location in the housing 12, the back wall 16' in the housing 12 (FIG. 1) which is shaped to improve the centering of a small cassette can be less inclined or tilted.

In the event a cassette is mis-presented when placed in the housing 12, the cavity never becomes aligned with the centering tab 40 and thus any portion of the bottom surface of the cassette that bears on the tab 40 causes the cassette to be raised in position as represented in FIG. 5, thereby warning the user that the cassette has been mis-presented even before the drawer 10 is actuated so the user can promptly cope with such error to keep the apparatus safe from any malfunction. If, by chance, the user fails to immediately notice the error, because the cassette is in its tilted and raised position shown in FIG. 5, the cassette projects above the top of the drawer 10 and thus above the top of the opening 74 provided in the front plate 76 of the apparatus for the passage of the drawer 10, which blocks inward movement of the drawer and indicates to and warns the user of an abnormal situation.

In connection with the movement of the slider 58 to power the rotation of the centering tab 40, it will be observed that the movement of the slider 58 is reversible at any time during the loading/unloading operation and at any position, accordingly, it is neither required nor necessary that a complete cycle of loading/unloading operation be achieved before any reversal of the direction of translation of the drawer 10 be powered at the controlled direction of the user.

The centering mechanism of the invention is implemented by simple and reliable components which can be easily incorporated in any loading/unloading system having a translatable housing because, by moving the centering mechanism to a non-interfering position during the translation loading movement, the mechanism is kept clear of any operating component of the apparatus, thereby insuring loading/unloading, driving of the tape, and playback and/or recording of information within the cassette can be achieved without interference.

Figure 7:
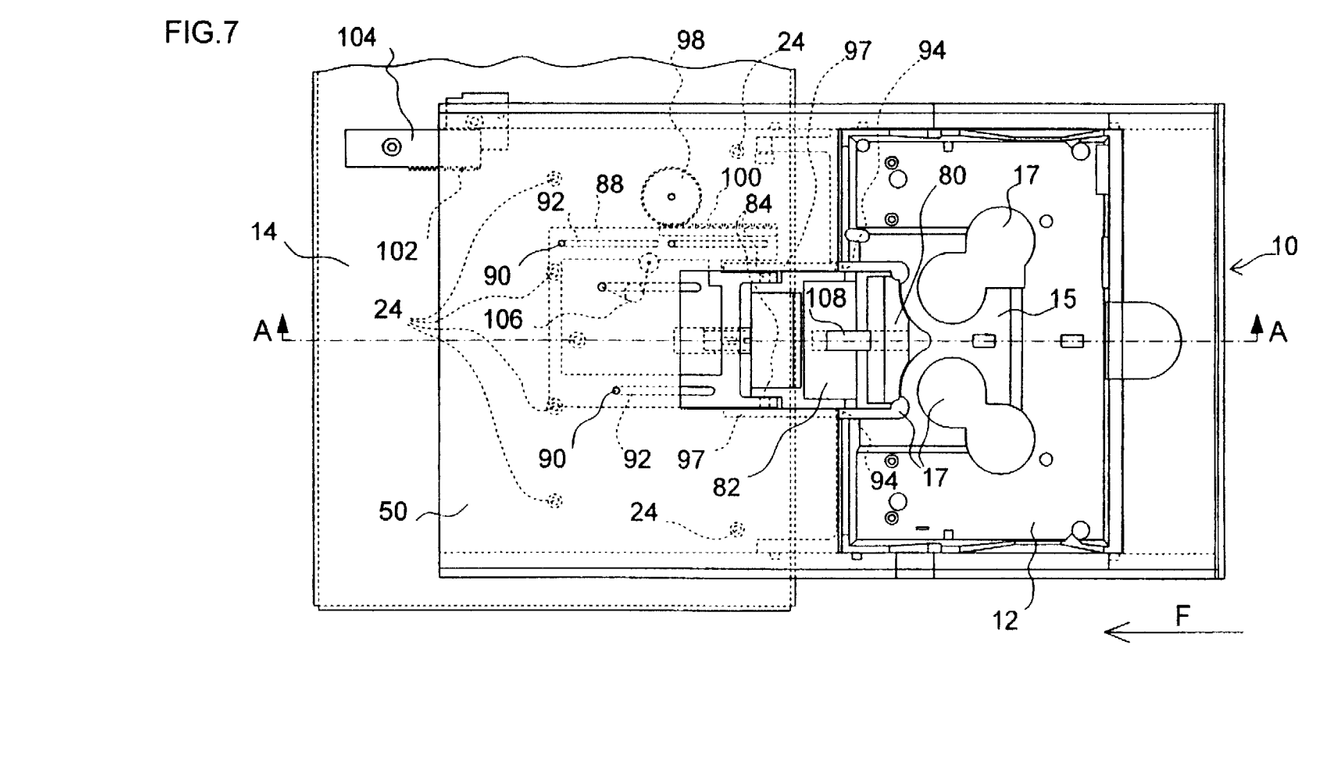
FIG. 7 is a view similar to FIG. 1 of a loading/unloading system incorporating a second embodiment of the centering mechanism of the invention.
Figure 8:
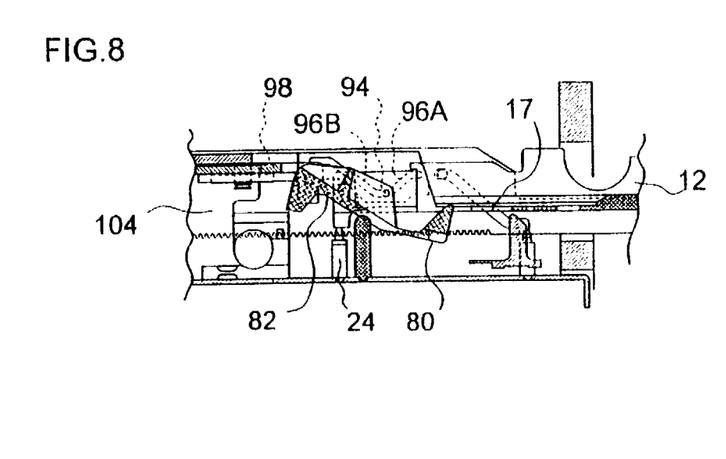
FIG. 8 is a view similar to FIG. 2 with the housing and drawer further inward and tab element of the second embodiment withdrawn from the cassette cavity and in an intermediate position.
Figure 9:
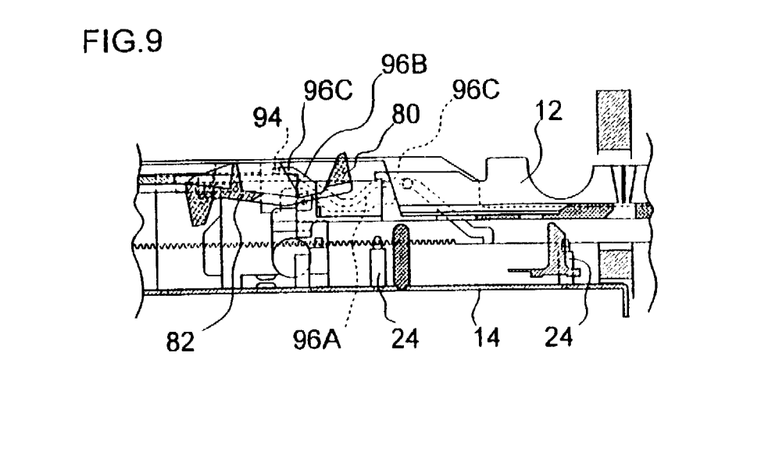
FIG. 9 is a view similar to FIG. 8 with the housing and drawer partially inside the apparatus and tab element in a final position when the housing is in the operative position.

Turning now to FIGS. 7–9, another embodiment of the centering mechanism of this invention is shown which is less preferred than the embodiment of FIGS. 1–4 for certain applications because the centering mechanism is somewhat less compact and involves more complex motions of the tab support, although, in certain aspects, it is more efficient because of providing stable end-of-movement positions and a translational movement of the tab for improving centering. As shown in these figures, as in the case of the embodiment of FIGS. 1–4, the centering mechanism is incorporated in a loading/unloading system having a drawer 10 comprising two external lateral walls 32 used as guides and interconnected by a horizontal plate member 50. The drawer 10 carries a movable housing 12 which in plan view is slightly larger than the largest cassette (i.e. a Standard DVC cassette) of the format to be accommodated and includes a shallow recess 15 for the smallest cassette (i.e. a Mini DVC cassette) of the format to be accommodated. As in the case of the previous embodiment the housing may be formed to define locations for any two of the three size DVC cassettes and, if desired, a second shallow recess may be included to provide a location for a third cassette and the drive means for the cassette reels modified to be adjustable to a spacing matching the spacing of the cassette-reels of the third size accommodated. For a more complete description and explanation of the loading/unloading system, reference may be made to the co-pending related application previously identified and to FIGS. 10,11 and 11A which include some parts not shown in FIGS. 5–9 of the loading/unloading system, it being noted that FIGS. 10,11 and 11A also illustrate the preferred embodiment of centering mechanism previously described.

Figure 7A:
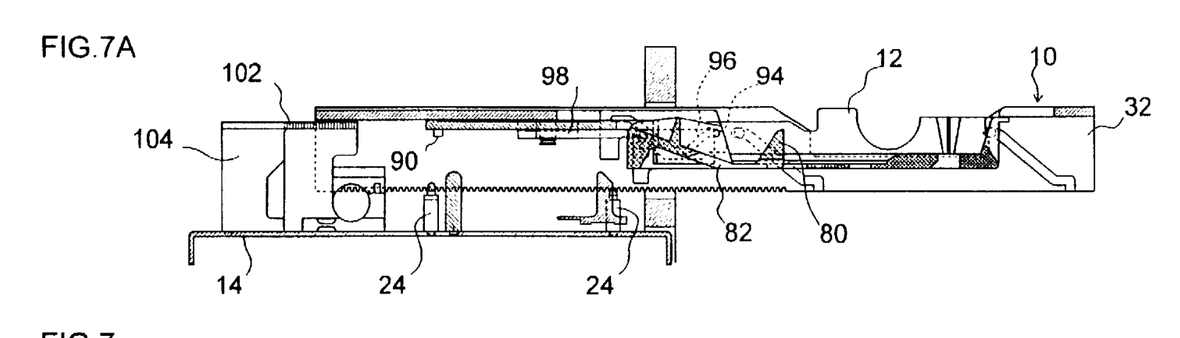
FIG. 7A is a view similar to FIG. 1A illustrating the second embodiment.

In carrying out this embodiment of the invention, as shown in FIGS. 7–9, the centering mechanism includes a centering tab 80 positioned within the openings 17 when the housing is in its loading/ejected position outside the apparatus (FIGS. 7,7A). The centering tab 80 extends substantially vertically and, because its shape defines a profile which approximately matches the profile of the cavity of a DVC cassette, insures accurate centering and positioning of any DVC cassette properly presented by the user.

The centering tab 80 is integral with a movable tab support 82 which is mobile with respect to the drawer 10 and housing 12 being pivotally linked near its forward end through lateral shafts 84 to a slider 88 which can slide with respect to the drawer 10 being carried on the horizontal plate member 50 of the drawer 10 by studs 90 on the plate 50 and grooves 92 in the slider 88. Studs 94 fixed to the lateral sides of the tab support 82 slide in V-shaped grooves 96 provided inside upstanding support walls 97 on the horizontal plate member 50 located proximate each side of the tab support 82.

To translate the slider 88 responsive to movement of the drawer 10, and housing 12, a drive connection is provided including a shaft fixed on the plate 50 of the drawer 10 which bears a pair 98 of identical horizontal gears free for rotation and interconnected by a friction facing. The bottom gear of the pair 98 meshes with gear teeth 100 provided on a side edge of the slider 88 while the top gear of the pair 98 can temporarily mesh with gear teeth 102 provided on a portion of a support 104 fixed on the frame 14.

Fixed to the slider 88 is one end of a hair-spring 106 which has its other end attached to the plate 50 so as to always push the slider 88 to each of its end-of-movement positions and resiliently keep it in both said positions.

The shape and size of the centering tab 80 and the mounting of the tab support 82 allow their displacement and pivoting within the apparatus without interfering with any element such as the driving means for the cassette reels, the playback/recording heads, etc. A slot 108 provided in the tab support 82 allows passage of the optical detecting means monitoring the tape travel.

When the user properly places a DVC cassette in its defined location in the housing 12, the centering 80 tab insures when it enters the cassette cavity a perfect centering and horizontal positioning of the cassette within the location in the housing 12.

During the loading operation the centering tab 80 is removed from the housing openings 17 and the cassette cavity and is pivoted and translated in the forward direction relative to the drawer 10 and housing 12 in an undulating motion to a non-interfering position shown in FIG. 9; during unloading the centering tab 80 is returned in the opposite direction in a similar undulating motion to the housing openings 17 and the cassette cavity. To achieve the desired translation and pivoting undulating motion of the centering tab 80, the grooves 96 in the support walls 97 facing the slider 88, which are engaged by the studs 94 extending from the tab support 82. are provided with a substantially V-shaped profile (FIGS. 7A,8,9) having sloping first and second sections 96A,96B. To remove the centering tab from a cassette during the loading operation, when the drawer 10 starts its inward movement (FIG. 7, arrow F), the housing 12 and thus the slider 88 and the tab 80 move in unison until the top gear of the pair 98 meshes with the fixed gear teeth 102 on the frame support 104. Upon such meshing, the top gear of the pair 98 is forced to rotate clockwise (FIG. 7) and this rotation is transmitted to the bottom gear by the friction facing. Because the shaft supporting the pair 98 of gears is fixed, the slider 88 through its side-edge gear teeth 100 is translated in the same direction as the drawer 10 and is moved a distance which is almost twice that of the drawer 10; thus, the slider 88 moves forward away from the housing 12 and, because the tab support 82 is carried by the slider 88, insures a forward translation of the tab support 82 (in the direction of the arrow F, FIG. 7) . In the course of the forward translation of the tab support 82 produced by the slider 88, the studs 94 of the tab support 88 slide along short horizontal legs 96C (FIG. 9) at the top of the downwardly sloping first sections 96A of the grooves 96 to initially shift the tab 80 horizontally through a very short distance relative to the housing 12 and insure a cassette held by the centering tab 80 is positioned properly within its defined location in the housing 12. This horizontal leg 96C also insures that in loading/ejected position the tab 80 is kept in operative position, an advantage over the first embodiment where keeping the tab 80 so positioned is insured by the hair-spring 64. Then the studs 94 slide along the downwardly sloping first sections 96A of the grooves (FIG. 8) which causes the tab support 82 to pivot the tab 80 downward and start in the undulating motion to its lowest position shown in FIG. 8 as the studs 94 reach the bottoms of the grooves 96. Because the tab support 82 and the tab 80 undergo on one hand the horizontal movement of the drawer 10 and, on the other hand, a translation movement with respect to the drawer powered by the slider 88, the tab support 82 and tab 80 are pivoted downward to clear the bottom of the housing 12, translated to an intermediate non-interfering position, and then pivoted upward to the final non-interfering position of FIG. 9 forward of the housing 12 where the tab support 82 and tab 80 remain until the unloading operation when the tab support 82 and tab 80 are returned to the housing 12 and cassette in the housing 12. In the course of the translation movement after passing the bottoms of the grooves 96, the studs 94 slide along the upwardly sloping second sections 96B of the grooves thereby pivoting the tab support 82 and continuing the undulating motion of the tab 80 upward to the position shown in FIG. 9. Again, a short horizontal leg 96C can be provided at the top portion of the section 96B of the groove 96 to provide a stabile position for the tab support 82 and the tab 80 in its non-interfering position, an advantage over the first embodiment where keeping the tab so positioned is insured mainly by the hair-spring 64. Thereafter, the housing 12 is lowered to transfer the cassette onto its supports 24 and into association with the driving, playback/recording means which occurs when the housing 12 comes against an abutment on the frame 14 and the drawer 10 continues its inward movement, as a result of interaction between the studs 28 supporting the housing 12 and the inclined grooves 30 on the inside of the drawer walls 32.

In the unloading operation, the previously described steps are performed in the reverse order. The housing 12 is raised to its upper position by forward movement of the drawer 10. The top gear of the pair 98 then meshes with the gear teeth 102 of the frame support 104, such meshing powering the bottom gear of the pair 98 which engages the gear teeth 100 on the side of and thus translation of the slider 88 toward the front end of the drawer 10. As the slider 88 moves by an amplitude which is about twice that of the drawer 10, the tab support 82 is moved toward the housing 12 and, as the studs 94 travel along the sloping second sections 96B of the grooves, the centering tab 80 start its undulating motion. The motion of the tab 80 is continued as the studs 94 pass through the bottoms of the grooves 96 and slide along the sloping first sections 96A of the grooves. The tab 80 is thus raised to progressively enter the openings 17 in the bottom of the housing 12 and the cavity of the cassette located in the housing 12.

Then the bottom gear of the pair 98 is disengaged from the gear teeth 100 of the slider 88 and the mechanism approaches the loading/ejected position. While performing its horizontal return translation, the slider 88 has moved the end of the hair-spring 106 attached to it on the other side of the anchoring point of the other end attached to the plate 50; the hair-spring 106 then pushes the slider 88, the tab support 82 and tab 80 toward the position of FIGS. 7,7a. Any further outward movement of the drawer 10 brings the housing 12 fully out of the apparatus to the loading/ejected position of FIGS. 7,7A where the user can remove any cassette from the housing to either load another one or close the drawer. The hair-spring 106 keeps the tab 80 in the stabile position shown in FIGS. 7,7a and thus positioned to be received in the cavity of a cassette properly placed in the housing 12, or to warn a user should a cassette be mis-presented or mis-positioned when placed in the housing.

I claim:

1. In a system for loading/unloading cassettes of a given format in a record/playback apparatus between a loading position and an operative position where a cassette is set on driving and playback/recording means, each of the cassettes having a shell with a bottom face and an information carrier within the shell, and each of the cassettes having a similar cavity with a standard profile on the bottom face of the cassette which provides access to the information carrier, the combination comprising:

a movable housing having a bottom on which a cassette is placed when the housing is in a loading position and which is movable to transfer the cassette between the loading and operative positions during a loading/unloading operation of the housing, and a centering mechanism for cassettes placed in the housing, the centering mechanism including a centering tab and a movable tab support, the centering tab being supported by the tab support in a cassette centering position projecting vertically above the bottom of the housing where it is located to be received in a cavity of a cassette placed in the housing when the housing is in the loading position, the centering tab defining a profile which approximately matches the standard profile of the cassette cavity, and a member linked to the housing and connected to the tab support during the loading/unloading operation to move the centering tab between its cassette centering position and a non-interfering position where the tab is clear of the housing and cassette.

2. The combination in a system according to claim 1, wherein the movable tab support of the centering mechanism is rotatably mounted, and the member is connected to rotate the tab support and the centering tab in an arc between the centering and non-interfering positions.

3. The combination in a system according to claim 2 wherein the tab support and centering tab rotate in an arc of substantially 180 degrees between the centering and non-interfering positions.

4. The combination in a system according to claim 1 wherein the movable tab support of the centering mechanism is pivotably and translatably mounted, and the member is connected to pivot and translate the tab support to move the centering tab in an undulating motion between the centering and non-interfering positions.

5. The combination in a system according to claim 4 wherein the movable tab support of the centering mechanism is pivotably and translatably mounted by studs extending from the tab support received in V-grooves in support walls, relative translation of the housing with respect to the tab support producing pivotal and translational motion of the tab support to move the centering tab between its centering position and the non-interfering position via the studs and V-grooves.

6. The combination in a system according to claim 5 wherein the V-grooves include a horizontal end portion, and relative translation of the studs in the horizontal end portion produces an initial translational movement of the tab with respect to the housing and causes a longitudinal movement of a cassette in the housing by the centering tab so that the cassette settles into its defined location.

7. The combination in a system according to claim 5 wherein the V-grooves include a horizontal end portion which provides stable end-of-movement positions for the tab support and stable centering and non-interfering positions of the centering tab.

8. The combination in a system according to claim 1 wherein the member of the centering mechanism is connected to the tab support to move the centering tab to the non-interfering position during the loading operation prior to a cassette reaching the operative position.

9. The combination in a loading/unloading system according to claim 1, the loading/unloading system including a frame, a translatable drawer on the frame, the drawer having a horizontal plate, and mechanism supporting the housing for translation and for movement vertically with respect to the drawer to transfer a cassette horizontally and vertically between the loading and the operative positions, and wherein the member of the centering mechanism is mounted for translation on the horizontal plate of the drawer and is linked to be translated responsive to translation of the drawer and housing on the frame by a gear mounted on the frame meshing with gear teeth on an edge of the member.

10. The combination in a system according to claim 9 wherein the tab support of the centering mechanism is fixed on a horizontal shaft supported on the horizontal plate, and the member is connected by gear teeth on an edge of the member which mesh with a gear on the horizontal shaft providing power to rotate the shaft and the centering tab responsive to translation of the drawer and housing on the frame during a loading/unloading operation.

11. The combination in a loading/unloading system according to claim 1, the loading/unloading system including a frame, a translatable drawer on the frame, the drawer having a horizontal plate, the centering mechanism being supported by the plate, and mechanism including studs and grooves having a horizontal end portion and inclined sections supporting the housing for translation and for movement vertically with respect to the drawer to transfer a cassette horizontally and vertically between the loading and the operative positions, and wherein an initial translational movement of the housing is produced due to displacement of the studs in the horizontal end portion of the grooves at the start of a loading operation which causes a relative longitudinal movement of the cassette so that it settles into its defined location in the housing.

12. The combination in a loading/unloading system according to claim 1, the loading/unloading system including a frame, a translatable drawer on the frame, the drawer having a horizontal plate, the centering mechanism being supported by the plate, and mechanism including studs and grooves having a horizontal end portion and inclined sections supporting the housing for translation and for movement vertically with respect to the drawer to transfer a cassette horizontally and vertically between the loading and the operative positions, and wherein the horizontal end portion of the grooves provides a stable end-of-movement centering position for the tab support and the centering tab.

13. The combination in a system according to claim 1 wherein the cassettes have similar cavities with a standard width and height, and wherein the centering tab has lateral extremities spaced by an outside lateral dimension, and a height, which match, respectively, the standard width and height of the cassette cavities.

14. In a system for loading/unloading cassettes of a given format in a record/playback apparatus between a loading position and an operative position where a cassette is set on driving and playback/recording means, each of the cassettes having a shell with a bottom face and an information carrier within the shell, and each of the cassettes having a similar cavity with a standard profile on the bottom face of the cassette which provides access to the information carrier, the combination comprising:

a movable housing having a bottom on which a cassette is placed when the housing is in a loading position and which is translatable and movable vertically to transfer the cassette between the loading and operative positions during a loading/unloading operation of the housing, and a centering mechanism for cassettes placed in the housing, the centering mechanism including a centering tab and a rotatably supported tab support, the centering tab being carried by the tab support in a cassette centering position projecting vertically above the bottom of the housing where it is located to be received in a cavity of a cassette placed in the housing when the housing is in the loading position, the centering tab defining a profile which approximately matches the standard profile of the cassette cavity, and a member linked to the housing and connected to the tab support during the loading/unloading operation to rotate the centering tab in an arc from/to its cassette centering position and a non-interfering position where the tab is clear of the housing and cassette.

15. The combination according to claim 14 wherein the cassettes have similar cavities with a standard width and height, and wherein the centering tab has lateral extremities spaced by an outside lateral dimension, and a height, which match, respectively, the standard width and height of the cassette cavities.

16. In a system for loading/unloading cassettes of a given format in a record/playback apparatus between a loading position and an operative position where a cassette is set on driving and playback/recording means, each of the cassettes having a shell with a bottom face and an information carrier within the shell, and each of the cassettes having a similar cavity with a standard profile on the bottom face of the cassette which provides access to the information carrier, the combination comprising:

a movable housing having a bottom on which a cassette is placed when the housing is in a loading position and which is translatable and movable vertically to transfer the cassette between the loading and operative positions during a loading/unloading operation of the housing, and a centering mechanism for cassettes placed in the housing, the centering mechanism including a centering tab and a pivotally and translatably mounted tab support, the centering tab being carried by the tab support in a cassette centering position projecting vertically above the bottom of the housing where it is located to be received in a cavity of a cassette placed in the housing when the housing is in the loading position, the centering tab defining a profile which approximately matches the standard profile of the cassette cavity, and a member linked to the housing and connected to pivot and translate the tab support in an undulating motion during the loading/unloading operation to move the centering tab between its cassette centering position and a non-interfering position where the tab is clear of the housing and cassette.

17. A centering mechanism for centering cassettes in a defined location in a housing, each of the cassettes having a shell with a bottom face and an information carrier within the shell, and each of the cassettes having a similar cavity with a standard profile on the bottom face of the cassette which provides access to the information carrier, the centering mechanism including a centering tab and a movable tab support, the centering tab being supported by the tab support in a cassette centering position projecting vertically above a bottom wall of the housing where it is located to be received in a cavity of a cassette placed in the defined location in the housing and in a non-interfering position free and clear of the housing and cassette, the centering tab defining a profile which approximately matches the standard profile of the cassette cavity, and a member which is connected to move the tab support and displace the centering tab between its cassette centering position and its non-interfering position.

18. A centering mechanism according to claim 17 wherein the movable tab support for the centering tab of the centering mechanism is rotatably supported, and the member is connected to rotate the tab support to rotate the centering tab in an arc between the centering and non-interfering positions.

19. A centering mechanism according to claim 17 wherein the movable tab support for the centering tab of the centering mechanism is pivotably and translatably mounted and the member is connected to pivot and translate the tab support to move the centering tab in an undulating motion between the centering and non-interfering positions.

20. A centering mechanism according to claim 19 wherein an initial translational portion of the undulating motion of the centering tab causes a longitudinal movement of the cassette in the housing so that it settles into its defined location.

21. A centering mechanism according to claim 20 wherein the support for the centering tab includes a V-groove having a horizontal leg which produces an initial translational portion of the undulating motion of the centering tab.

22. A centering mechanism according to claim 21 wherein the horizontal leg of the V-groove further provides a stabile end-of-movement position of the centering tab.

23. A centering mechanism according to claim 17 and mechanism movably supporting the housing which produces an initial translational movement of the housing relative to the centering mechanism and causes a longitudinal movement of the cassette in the housing so that it settles into its defined location.

24. A centering mechanism according to claim 23 wherein said mechanism movably supporting the housing further provides a stabile end-of-movement position of the housing.

25. A centering mechanism according to claim 17 wherein the cassettes have similar cavities with a standard width and height, and wherein the centering tab has lateral extremities spaced by an outside lateral dimension, and a height, which match, respectively, the standard width and height of the cassette cavities.

\* \* \* \* \*